United States Patent [19]
Graham

[11] 3,727,219
[45] Apr. 10, 1973

[54] INTERFEROMETER NULL MULTIPLICATION TECHNIQUE AND APPARATUS

[75] Inventor: Leroy C. Graham, Phoenix, Ariz.

[73] Assignee: Goodyear Aerospace Corporation, Akron, Ohio

[22] Filed: May 26, 1971

[21] Appl. No.: 147,113

[52] U.S. Cl.....................................343/5 CM, 356/5
[51] Int. Cl................................................G01s 9/02
[58] Field of Search ........................343/5 CM; 356/4, 356/5

[56] References Cited

UNITED STATES PATENTS

| | | | |
|---|---|---|---|
| 3,427,104 | 2/1969 | Blikken et al. | 356/5 |
| 3,427,105 | 2/1969 | Ingalls | 356/5 |
| 3,129,422 | 4/1964 | Fox | 343/5 CM |
| 3,351,936 | 11/1967 | Feder | 343/5 CM |
| 3,560,973 | 2/1971 | Kazel | 343/5 CM |

Primary Examiner—Benjamin A. Borchelt
Assistant Examiner—G. E. Montone
Attorney—J. G. Pere and L. A. Germain

[57] ABSTRACT

A technique and apparatus by which the signals from two interferometer antennas are recorded on the same film, but in separable form. The signals can be reproduced by the use of coherent light and a phase shift may be introduced into one of the reproduced signals to permit the formation of null images corresponding to varying depression angles.

11 Claims, 12 Drawing Figures

INVENTOR
LEROY C. GRAHAM

BY
*Oldham & Oldham*
ATTORNEYS

INVENTOR
LEROY C. GRAHAM

BY
Oldham & Oldham
ATTORNEYS

INVENTOR
LEROY C. GRAHAM

PATENTED APR 10 1973 3,727,219

INVENTOR
LEROY C. GRAHAM

BY
Oldham & Oldham
ATTORNEYS

INTERFEROMETER NULL MULTIPLICATION TECHNIQUE AND APPARATUS

The present invention relates to radar mapping techniques and more particularly to such techniques which employ null formation principles.

Radar mapping is accomplished by detecting the reflection of a single radar beam from terrain with two spacially separated antennas and combining the resultant signals. The null points of the combined signals provide a unique representation of the terrain.

Present radar mapping techniques are of limited usefulness. The fundamental problem is that with achievable, vertical antenna separation and practical radar wave lengths for weather penetration, interferometer null separations on the terrain are too great to define the terrain surface accurately enough for large scale topographic mapping. Various solutions to the problem have been proposed, including offset oscillators, parallel channels, and switched interchannel phase shift. However, these solutions provide only highly limited improvements and require additional equipment capabilities, substantially increasing costs.

It is the primary object of the present invention to provide an interferometer null multiplication technique which effectively overcomes the above problem without substantially increasing equipment cost or capabilities.

A further object of the invention is the provision of a null multiplication technique and apparatus which is capable of defining the terrain surface with sufficient accuracy to permit large scale topographic mapping.

Yet another object of the invention is the provision of a null formation technique and apparatus in which the interferometer signals are recorded prior to null formation to permit subsequent reproduction of the signals and variation of the phase relationship of the signals to permit the formation of null images corresponding to varying angles of depression.

The above and other objects of the invention which will become apparent in the following detailed description are achieved by providing interferometer null formation techniques and apparatus in which the signals of two spacially separated interferometer antennas are recorded on a common film in a form in which the two signals are separately reproducable and in which the signals reproduced by coherent light techniques are supplied to an optical correlator for the formation of null images. Phase shifting or delaying means may be included in one of the coherent light paths to effect a relative phase shift between the two signals to provide multiple null images corresponding to different angles of inclination.

For a more complete understanding of the invention and the objects and advantages thereof, reference should be had to the following detailed description and the accompanying drawings wherein there is shown a preferred embodiment of the invention.

Figure 1:
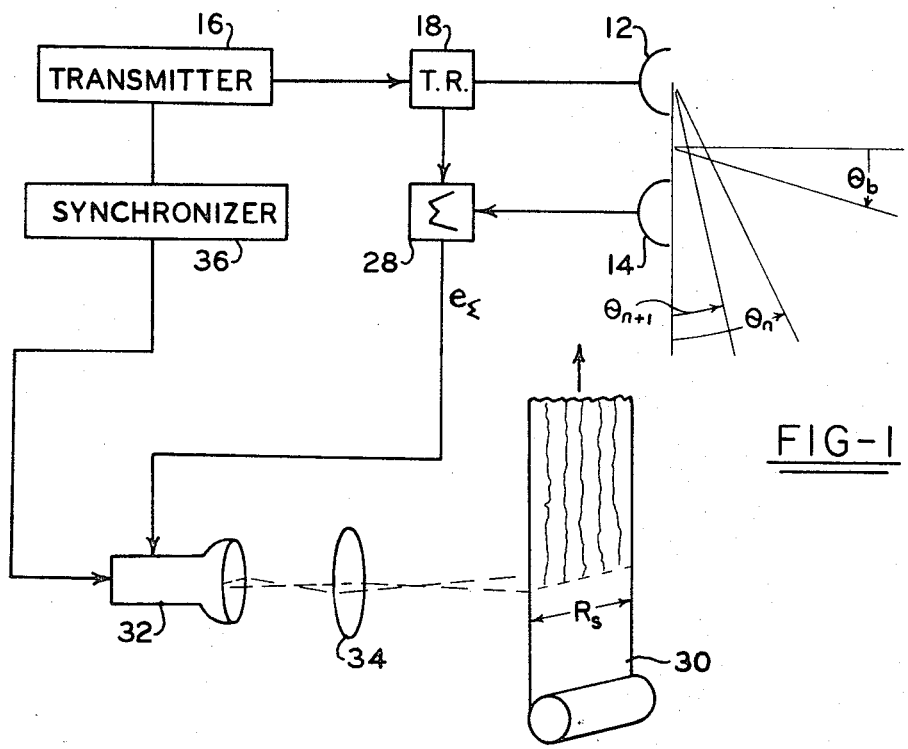
FIG. 1 is a highly schematic showing of a basic interferometer antenna assembly.
Figure 2:
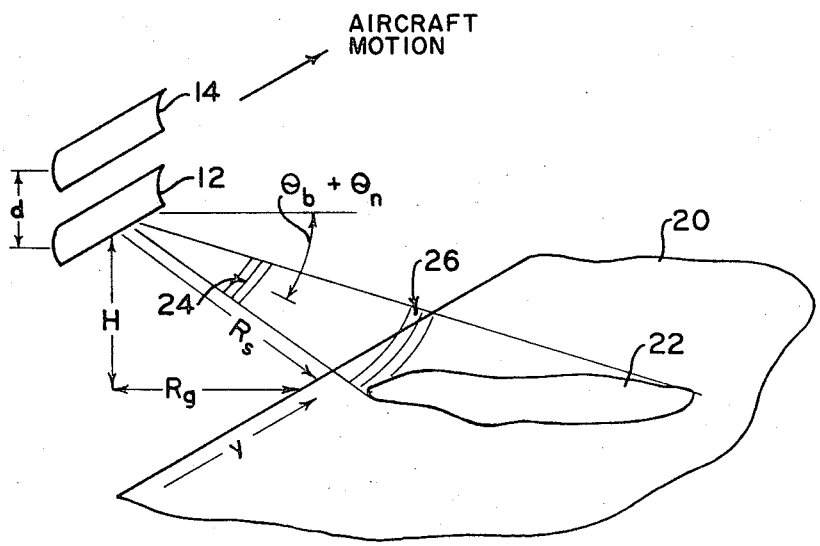
FIG. 2 is a schematic view showing the relationship of the interferometer antenna system to a strip of terrain.
Figure 3:
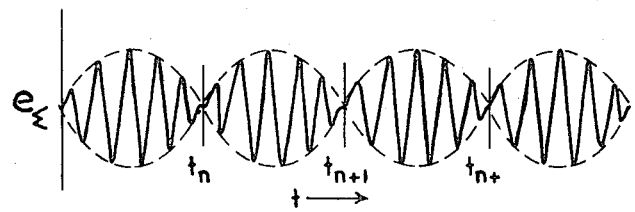
FIG. 3 is a graph illustrating the output signal of the system of FIG. 1.

Referring now to FIGS. 1, 2 and 3, the basic interferometer action will now be described. The basic system 10 consists of a pair of radar antennas 12 and 14, a transmitter 16 for driving the antenna 12 through a transmit-receive device 18, and summation means 28 for combining the return signals from the two antennas 12 and 14. The antennas 12 and 14 extend parallel to one another and have a uniform separation $d$.

INTERFEROMETER ACTION

As shown in FIGS. 1 and 2, a pulse is transmitted from a single antenna 12 perpendicular to the flight path of the aircraft carrying the system, that is, sideways. The single antenna 12 has a fan shaped beam 24 broad in the vertical plane (a few degrees or tens of degrees) and narrow in the horizontal, or azimuth, direction (a fraction of a degree). This beam defines a strip of terrain to the side of the aircraft, and this strip is illuminated by the pulse 24 from antenna 12 sequentially, near terrain first followed by terrain at successively greater ranges.

Some of the energy striking the terrain 20 is scattered back toward the radar. The approximately plane waves 26 which arrive back at the radar antennas 12 and 14 arrive from depression angles $\theta_n$ which continually decrease as signals return from greater ranges. (Assuming the terrain does not slope more steeply than a right angle to the line of sight, a condition satisfied most of the time.) The returning waves are sensed by both antennas 12 and 14 as shown in FIG. 1. Since the path lengths to the two antennas are different in general, the waves sensed are in general not in step, or in phase. In fact, at certain (determinable) angles the waves will be exactly out of phase and when the outputs of the two antennas are added, will cancel, or destructively interfere causing a null or zero output. By measuring the time at which the nulls occur (with respect to the transmission of the original pulse) the slant range corresponding to the terrain at each null angle can be determined, as shown in FIG. 3. (The nulls are, of course, ambiguous and the ambiguity must be resolved by determining the range to one of them, as with ground control. The others are then determined by counting since they must occur sequentially.)

The condition for a null output is that the path length difference $a_n$ be an odd number of half wave lengths or $$a_n = (\lambda/2)(2n+1)$$

which occurs at angles $$\theta_n = \text{Sin}^{-1}(\lambda/2d)(2n+1)$$

so that the spacing in the vicinity of $\theta_n = 0$, the boresight, is approximately $\lambda/d$. The slant range to each null is determined by measuring elapsed time from pulse transmission and calculating from $$R_{s_n} = Ct_n/2.$$

The ground range $R_G$ and elevation h can then be calculated by triangulation.

$$R_{G_n} = R_{s_n} \cos(\theta_n + \theta_b)$$

$h_n = R_{s_n} \text{Sin}(\theta_n + \theta_b)$ where $\theta_b$ is the depression angle to the boresight, the perpendicular bisector of a line connecting the two antenna phase centers.

The received demodulated signals are recorded in linescan radar fashion as shown in FIG. 1. The line scan of an intensity modulated trace in a cathode ray tube 32 is imaged by the optics 34 on photographic film 30. A synchronizer 36 synchronizes the trace with the transmitter 16 so that distance along the trace, across the film 30 is in proportion to time, or slant range. The density modulated recorded trace is therefore a slant range record of the radar reflectivity of the terrain in the antenna beam modulated by the interferometer nulls. As the antenna beam is swept along the terrain the film is moved so that adjacent antenna illuminated strips are recorded side-by-side along the film, building up an "image" of the terrain with interferometer modulation. The nulls will remain at the same range in flat terrain or move gradually as terrain elevation changes along track, causing null lines in the image. The lines are intersections of constant depression angle planes with the terrain. Null position is recovered by measuring slant range (proportional to cross track film position) at a given null line, after identifying the angles corresponding to each line. As stated earlier, terrain sampling occurs because accurate measurements can only be made at the null angles $\theta_n$. The angular spacing, $\theta_n - \theta_{n-1}$ depends on the ratio $\lambda/d$. The wavelength $\lambda$ must be kept large enough for good weather penetration and the separation d small enough for practical aircraft installation.

SYNTHETIC APERTURE RADAR

Figure 4:
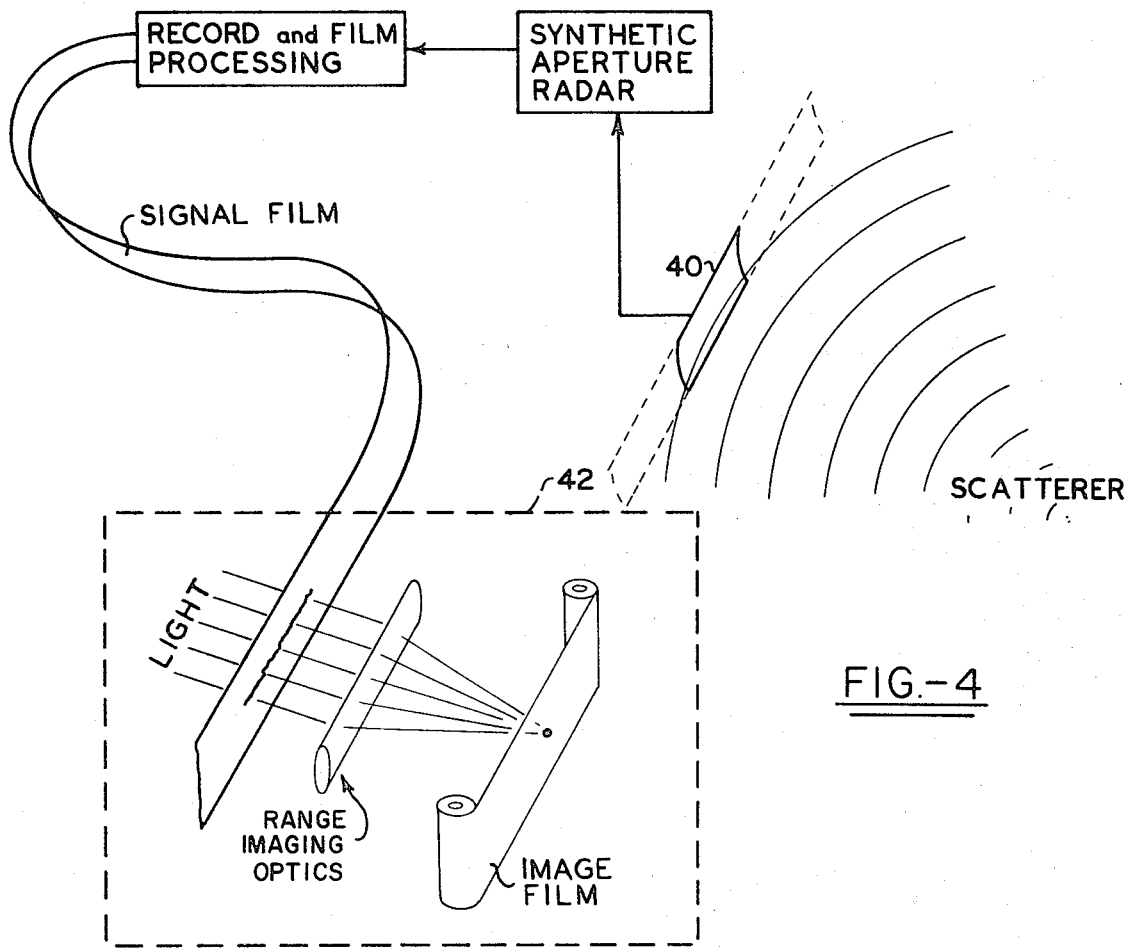
FIG. 4 is a schematic illustration of a synthetic aperture radar system.

In a synthetic aperture radar, the effective antenna length is formed by recording signals whose amplitude is proportional to both phase and amplitude of the radar signals received on a short physical antenna 40 which is moved along a flight path. The radar signals are re-formed in scaled down space in an optical analog processor 42, thus synthesizing a long antenna as shown in FIG. 4. Since the long track image resolution, or ability to portray fine detail, varies with antenna length, it is important to use as long an antenna as possible. As shown later, an interferometer can be formed with either real or synthetic antennas.

Figure 5:
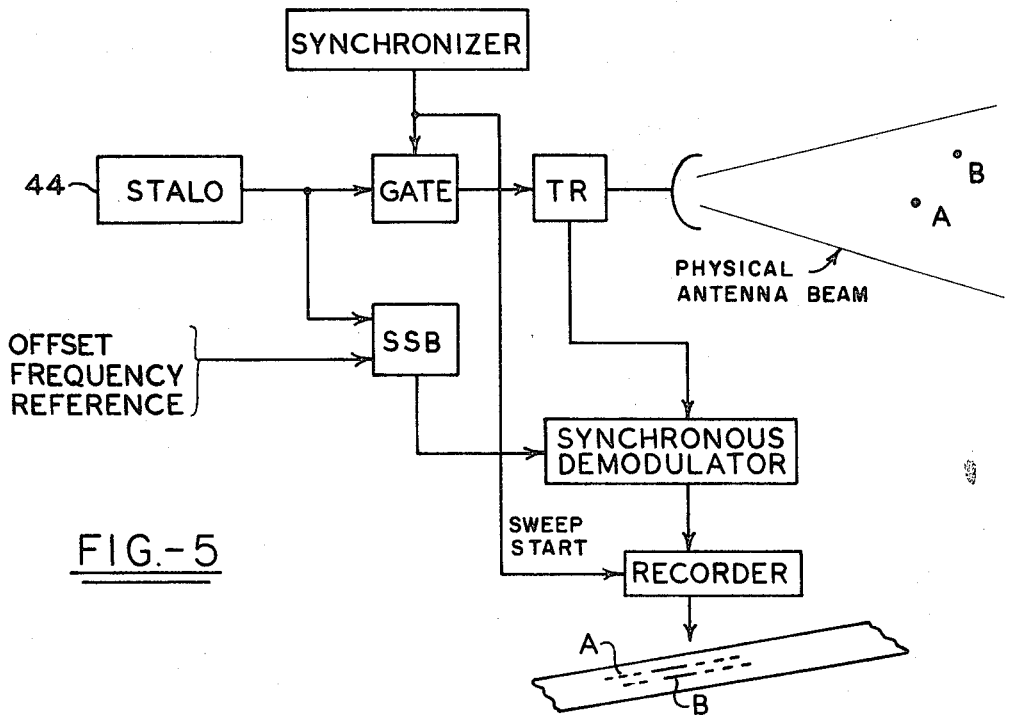
FIG. 5 is a schematic illustration of the apparatus performing the synthetic antenna of FIG. 4.

As shown in FIG. 5, the synthetic antenna is formed by transmitting pulse to pulse coherent (in time phase) signals from a gated CW stable local oscillator 44, or STALO, and phase detecting the returned signals with the CW oscillator used as a reference.

The phase detected signals from individual scatterers are amplitude modulated (density modulated on the signal film) by the phase change caused by small changes in slant range as the targets pass through the physical antenna beam. The rate of change of range, and thus the rate of change of phase (Doppler frequency) and spatial frequency of the recorded signals, is relatively large at the edges of the beam and zero in the center. The relative scatterer positions and signal film format for two scatterers at two different ranges is shown in FIG. 5. To facilitate processing, the phase detector reference is usually shifted by an offset frequency before recording, as shown in FIG. 5, so that the maximum recorded spatial frequency is higher than without the offset.

Figure 6:
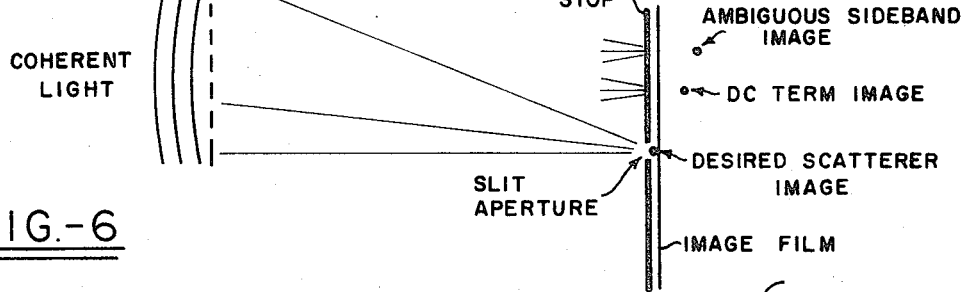
FIG. 6 is a schematic showing of the principles by which the recorded interferometer image is reproduced.

In the optical processor the signal film is illuminated with monochromatic slightly overcollimated light. (Highly monochromatic light is often referred to as "coherent" light). The recorded signals act as diffraction gratings, focusing the light at a point corresponding to the scatterer location in the original radar space, as shown in FIG. 6, where only the azimuth or along track dimension of the correlator is shown. Signals at different ranges are kept separated by the orthogonal range imaging optics shown in FIG. 4.

Because the recorded signals have a non-zero average light transmission (no negative values, or light gain, is feasible) a portion of the original light wave is unchanged and focuses at a point corresponding to the convergence point of the incident waves. Also an ambiguous image of the scatterer is focused at a third point. This action is functionally similar to a carrier and two sidebands of an amplitude modulated signal, and the three images often referred to as the carrier image or D.C. term and the desired and ambiguous sidebands. The distance between the D.C. term and the sidebands is proportional to the offset frequency. The purpose of the offset frequency is to permit separation of the desired sideband from the D.C. term and ambiguous sidelobe by means of a slit aperture in an optical stop.

SYNTHETIC INTERFEROMETERS

Figure 7:
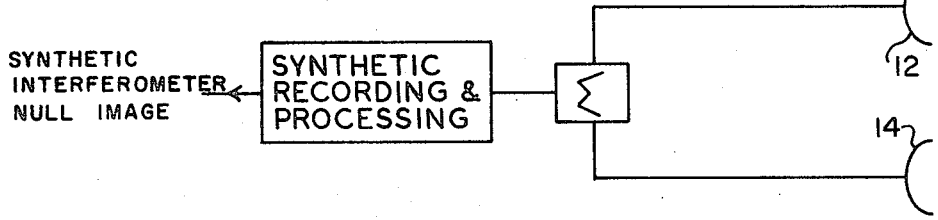
FIG. 7 illustrates schematically one arrangement for recording and processing the antenna images.
Figure 8:
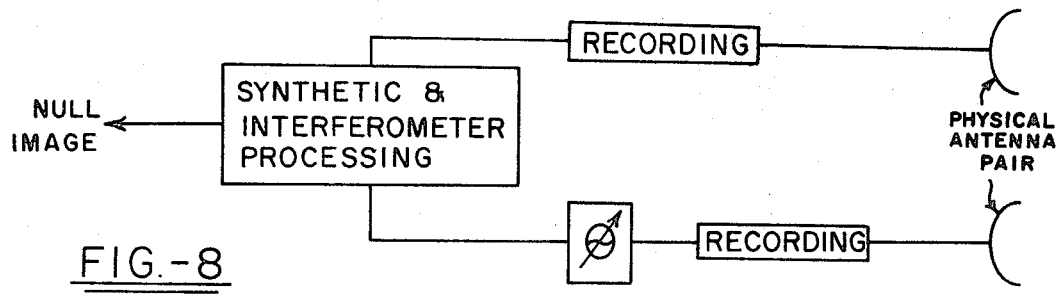
FIG. 8 illustrates schematically a second arrangement for recording and processing the antenna images.

The inherently more detailed and accurate synthetic antenna may be combined with the vertical interferometer for topographic mapping in several ways. The most convenient is obtained by realizing that interferometer processing and synthetic antenna processing are both linear processes and may be interchanged without altering the nature of the output. Thus the configuration of FIG. 7, in which the signals from two short receiving antennas 12 and 14 are first summed and then synthetic antenna recorded and processed, results in an output the same as that of FIG. 4 with very long antennas. Significant advantages can be obtained; however, if the two signals can first be recorded separately and then interferometer processed after or during synthetic antenna formation, as shown in FIG. 8. The primary advantage of doing so is that various amounts of differential phase shift — resulting in various null positions in between the original nulls — can be inserted in a number of separate processings. Each processing with a different phase shift results in a new set of terrain samples, relieving the terrain sampling problem.

Figure 9:
FIG. 9 is a view showing a strip of signal film and illustrates the superimposed recording of the two antenna signals on the strip.
Figure 10:
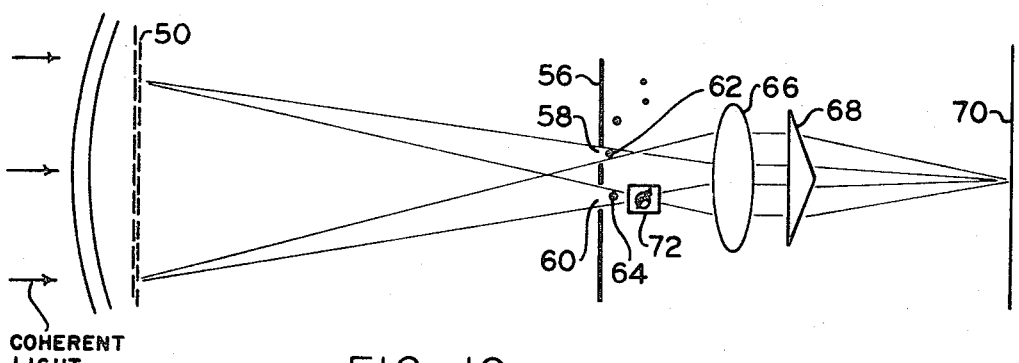
FIG. 10 is a schematic illustration of a first arrangement for reproducing the recorded images of the film strip of FIG. 9 to produce an interferometer image film.

If the recordings of FIG. 8 were made separately, it would be very difficult to obtain the required exact registration for subsequent comparison of signals from exactly the same terrain in the two records. The proposed technique overcomes the difficulty by recording the signals from the two antennas simultaneously superimposed on the same strip of signal film 50. Separability is retained by recording them with different offset frequencies, as shown in FIG. 9. The two signals 52 and 54 can then be separated out in the optical processor since the offsets cause them to focus at different points, as shown in FIG. 10.

Since the optical images of the recorded signals 52 and 54 have different offset frequencies, these images may be separated by two spaced apertures 58 and 60, respectively, of an optical stop 56. The two optical images are then focused through a relay lens 66 and a combining prism 68 to form the interferometer image on a second film 70. A differential phase shift means 72 may be inserted into the optical path of one of the images 62 or 64 to vary the offset frequency of this image relative to the other image. This arrangement permits the interferometer image to be varied, simulating terrain mapping at differing angles of inclination. By means of the differential phase shift device 72, multiple interferometer images may be achieved from the same signal film images 52 and 54.

Figure 11:
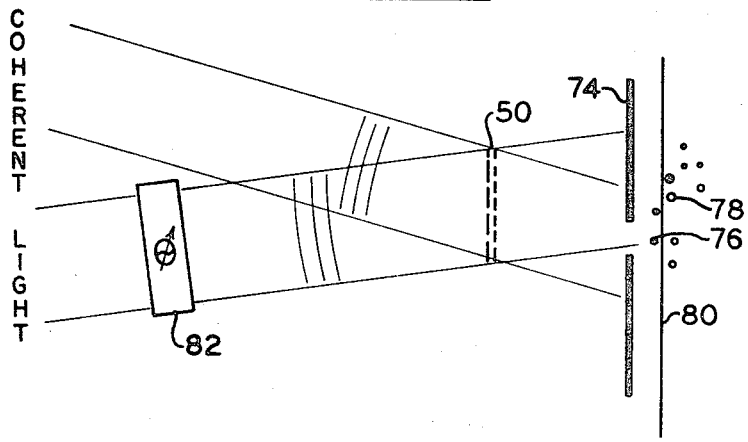
FIG. 11 is a schematic showing of a second arrangement for reproducing the images recorded on the film strip of FIG. 10.

FIG. 11 illustrates a more convenient configuration for forming the interferometer image from the signal film 50. In this arrangement, the signal film 50 is eliminated by two coherent light channels which originate from the same source, but are directed to the signal film in angled relation to one another. The resultant optical images are projected to an optical stop 74 having a single aperture. A single side band image of each of the recorded signals 52 and 54 will be received through the aperture of the stop 74 and recorded on the interferometer film 80. When the side band images 76 and 78 of the signals 52 and 54, respectively, are coincident, this is recorded as a null on the interferometer image film 80. Again, a variable path length means 82 may be employed to vary the phase relation of one of the two optical images. In the arrangement of FIG. 11, the variable path length means 82 is inserted into one of the two coherent light channels, ahead of the signal film 50.

Figure 12:
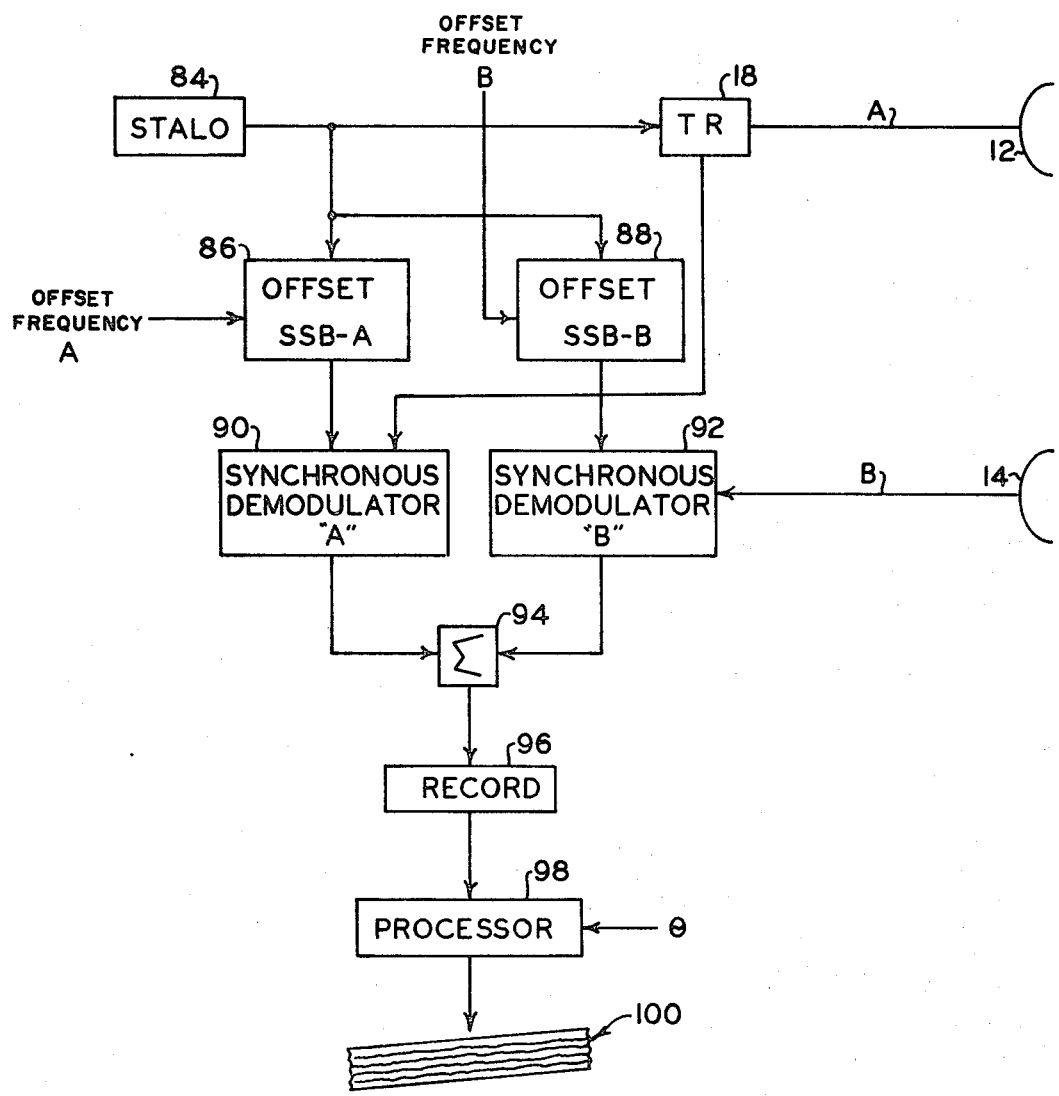
FIG. 12 is a schematic block diagram of the interferometer of the present invention.

The overall interferometer system is illustrated schematically in FIG. 12. As is illustrated, the overall system includes the spaced antennas 12 and 14, a stable local oscillator 84, the transponder 18 for driving the antenna A from the oscillator 84 and for supplying the received signal from the antenna A to the associated synchronous demodulator 90. The system also includes single side band offset generators 86 and 88 associated, respectively, with the synchronous demodulators 90 and 92 of the antenna channels 12 and 14. The two antenna signals, having their respective offsets, are combined in the summation means 94 and the resultant signal is recorded on the signal film 50 by the recorder 96. The signal film is then supplied to the processor 98 which may be of the type shown in FIG. 10 or FIG. 11.

It should be understood that while only the best known embodiment of the invention has been illustrated and described in detail herein, the invention is not so limited. Reference therefore should be had to the appended claims in determining the true scope of the invention.

What is claimed is:

1. Radar mapping apparatus, comprising:
   a pair of spacially separated radar antennas;
   a transmitter connected to one of the antennas for transmitting a radar pulse;
   receiver means connected to each antenna for separately receiving reflected radar pulses at each antenna;
   means for converting the separately received radar images into separate optical images;
   means for recording the two optical images in separable relationship on a common photographic film;
   an illumination source providing two separate coherent light beams directed to a common point, the light beams being directed through the photographic film to separately reproduce the two optical images; and
   means for detecting nulls in the combined optical image.

2. Apparatus according to claim 1 further including phase shifting means in one of the coherent light beams.

3. Apparatus according to claim 2 wherein the phase shifting means intercepts the one light beam prior to illumination of the film.

4. Apparatus according to claim 2 wherein the phase shifting means intercepts the one light beam after illumination of the film.

5. Apparatus according to claim 1 further including means for effecting a phase shift in the output signal of at least one of the receivers.

6. Apparatus according to claim 5 phase shifting means are provided for each of the receiver output signals, the amount of phase shift differing for each receiver output signal.

7. Radar mapping apparatus, comprising:
   two spacially separated radar antennas;
   a transmitter connected to one of the antennas for transmitting a radar pulse from the one antenna;
   two receivers, one connected to each antenna, for receiving the reflection of the transmitted radar pulse from a strip of terrain;
   means to convert the output signal of each receiver into an optical signal;
   means to record the two optical signals in separable form on a common photographic film;
   a coherent light source for illuminating the photographic film to project the two images separately to a common point; and
   means to detect nulls formed by the two projected images at the common point.

8. Radar mapping apparatus according to claim 7 further including means for effecting a phase delay of one of the projected images relative to the other projected image.

9. Radar mapping apparatus according to claim 8 wherein the means for effecting a phase delay comprises a variable path length device inserted in the path of one of the projected images prior to the common point.

10. Radar mapping apparatus according to claim 8 wherein the coherent light source includes means to separate the coherent light into two light beams each passing through the film to the common point.

11. Radar mapping apparatus according to claim 10 wherein the delay means comprises a variable path length device inserted into one of the two light beams prior to the photographic film.

* * * * *